April 15, 1958 P. T. MENOHER 2,830,376
GAUGING APPARATUS UTILIZING AN ELASTICALLY EXPANSIBLE PLUG
Filed May 24, 1955 2 Sheets-Sheet 1
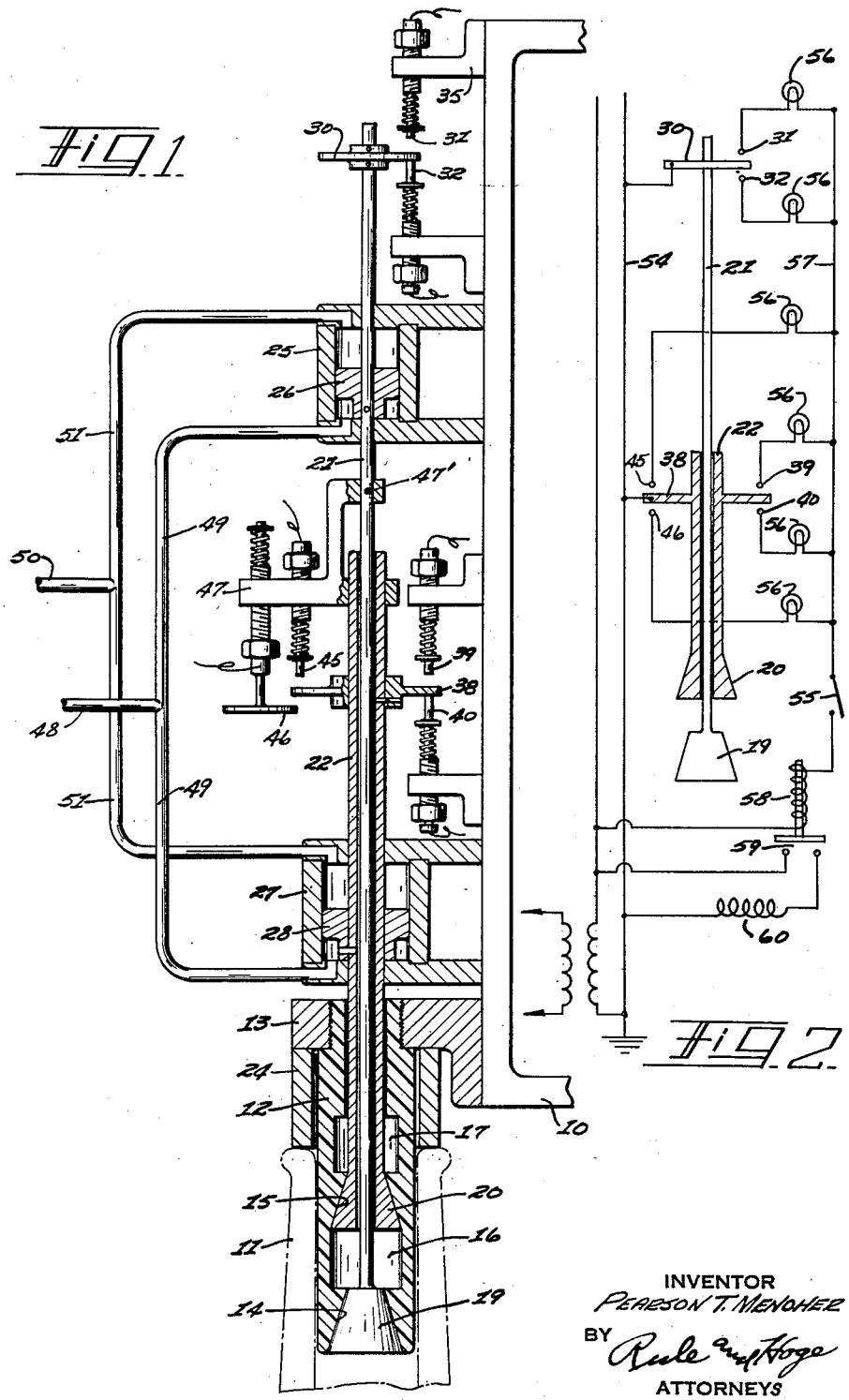
INVENTOR
PEARSON T. MENOHER
BY
ATTORNEYS April 15, 1958 P. T. MENOHER 2,830,376
GAUGING APPARATUS UTILIZING AN ELASTICALLY EXPANSIBLE PLUG
Filed May 24, 1955 2 Sheets-Sheet 2

INVENTOR
PEARSON T. MENOHER
BY
ATTORNEYS

United States Patent Office 2,830,376
Patented Apr. 15, 1958

2,830,376

GAUGING APPARATUS UTILIZING AN ELASTICALLY EXPANSIBLE PLUG

Pearson T. Menoher, Oakland, Calif., assignor to Owens-Illinois Glass Company, a corporation of Ohio Application May 24, 1955, Serial No. 510,761

11 Claims. (Cl. 33—178)

My invention relates to gauging apparatus comprising expansible gauging means which may be used for gauging the interior diameters of tubular or hollow articles. The invention provides means for concurrently gauging surfaces at different positions lengthwise of the article and automatic means for operating signal devices or other means when the dimensions at either gauging point or area are either above or below a prescribed limit, and also for comparing the relative dimensions at such points or areas and giving a signal when the differential between said areas exceeds a prescribed limit.

The invention may be used, for example, for gauging the interior surface diameters of bottle necks, and is herein illustrated and described as adapted for this purpose. In the manufacture of glass bottles, means for gauging the inner surface diameter of the bottle necks are extensively used, means being provided for automatically discarding those in which such diameters are greater or less than prescribed limits which may be within close tolerances. For many uses it is important that the inner diameters of the bottle necks be of substantially the same dimensions and moreover, that the interior wall surfaces should be substantially straight and of uniform diameter throughout a prescribed area, or of specified dimensions at certain points spaced lengthwise thereof.

An object of the present invention is to provide a practical form of apparatus for gauging the interior diameters of bottle necks or the like as the articles are conveyed through a gauging station, together with means for automatically segregating the defective articles from those which pass the test. The invention in its preferred form provides an expansible gauging element in the form of an approximately cylindrical plug consisting of elastic resilient material, the plug being of hollow formation with conical or tapered inner wall sections. Within the hollow plug are expanding or spreading devices with tapered surfaces cooperating with those of the plug for expanding the plug by movement lengthwise thereof when the plug has been introduced into the neck of the article under test. The extent of movement of the spreading devices is a function of the degree of expansion of the gauging plug and is limited and determined by the diameter or diameters at the areas under test. The movement of the gauging elements is utilized to operate electrical contacts in an indicating or rejector system when the diameters at the gauging areas are outside of prescribed limits or when the differential between the diameters at such areas exceeds a predetermined limit.

Referring to the accompanying drawings:

Fig. 1 is a sectional elevational view of the gauging apparatus with certain parts omitted;

Fig. 2 is a schematic diagram of the electrical control system;

Figure 3:
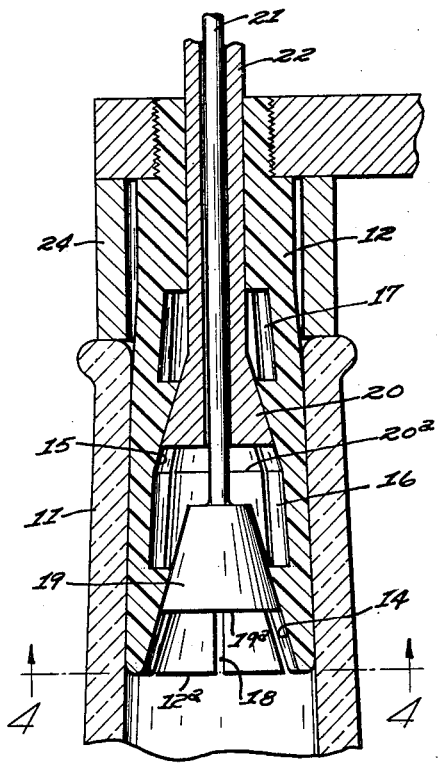
Fig. 3 is a sectional elevation showing the gauging plug and associated parts in operative position within a bottle neck.
Figure 4:
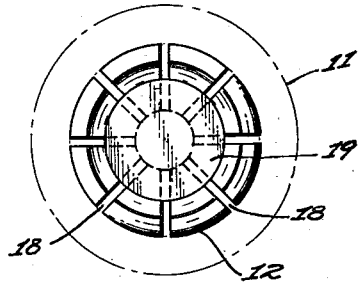
Fig. 4 is a cross section at the line 4—4 on Fig. 3.

Referring to Fig. 1, the gauging mechanism is carried on a vertically disposed frame 10 which may be mounted for up-and-down movement by conventional means (not shown) for moving the gauging head or plug into and out of the necks of the articles 11 which are being gauged. A gauging element in the form of a cylindrical plug 12 made of a tough, elastic, resilient material such as nylon, is formed with a screw-threaded end portion by which the plug is attached to a holder 13 on the frame 10. The plug is of a hollow formation, the interior surface comprising frusto-conical wall surfaces 14 and 15 spaced apart vertically with a cylindrical space or chamber 16 between the tapered sections. A second cylindrical space or chamber 17 is formed above the upper conical surface.

The walls of the gauging plug 12 are formed with slits 18 extending upwardly from the lower end of the plug, said slits being arranged in an annular series. This construction permits lateral expansion of the gauging plug. Such expansion is effected by expanding or spreading devices in the form of frusto-conical heads 19 and 20 which respectively engage the tapered wall surfaces 14 and 15 of the plug 12. The conical heads 19, 20 are operated as presently described for spreading the plug. When the heads 19, 20 are withdrawn the elastic resilience of the plug causes it to contract and resume its original shape. The head 19 has attached thereto a vertical stem 21 extending upwardly therefrom through a tubular stem 22 attached to or formed integral with the conical head 20. The gauging plug 12 is of a diameter to fit freely within a bottle neck 11 which is under test when said neck is of normal diameter.

In operation the frame 10, attached plug 12 and the heads 19, 20 are moved downward as a unit to lower the plug into the neck 11 of the bottle. Such downward movement is limited by a spacer 24 which seats on the bottle finish. After the plug is thus lowered into operative position the heads 19 and 20 are moved upwardly. The lower expansion head 19 spreads the lower end portion of the gauging plug to an extent determined by the diameter of the portion of the bottle neck opposite the head 19. The extent of the upward movement of the head 19 is limited and determined by the diameter at this area, the end portion of the plug 12 being wedged in between the head 19 and the opposite surface of the bottle neck. This upward movement of the head 19 is effected by a piston motor 25 mounted on the frame 10 and having a piston 26 keyed to the stem 21.

The upper expansion head 20 is moved upwardly in the same manner as the head 19 by a piston motor 27 comprising a piston 28 keyed to the tubular stem 22. The head 20 expands that portion of the plug 12 which is in direct contact therewith and to an extent determined by the interior diameter of the bottle neck at the area of such contact. The extent of the upward movement of the head 20 is controlled and determined by the diameter at such area. The construction of the expansible plug 12 is such that the different sections thereof under the control of the expanding heads 19 and 20, respectively, can be spread or expanded independently of each other, the resiliency of the plug allowing it to resume its normal shape when said expanding heads are again lowered.

Figure 5:
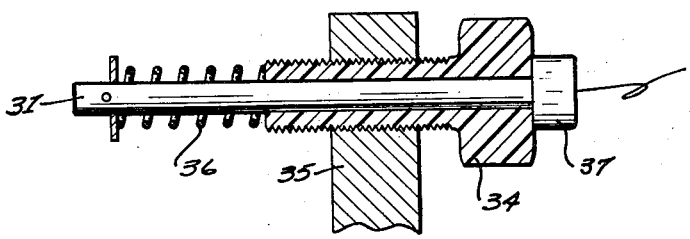
Fig. 5 is a fragmentary sectional view of an electrical contact rod and its mounting.

The stem 21 of the head 19 has attached thereto an electrical contact member 30 or disk which extends between electrical contacts 31 and 32. The contact 31 as shown in detail in Fig. 5 is in the form of a rod mounted for free sliding movement lengthwise within an insulator 34. The insulator is in the form of a bolt screw-threaded through a bracket 35 attached to the frame 10. The contact rod 31 is spring loaded by a coil spring 36 mounted thereon and held under compression. A head 37 on the contact rod limits its movement. The bolt 34 is adjustable in the bracket 35 for adjusting the contact 31 toward and from the disk 30 (Fig. 1). The construction and mounting of the contact 32 and other electrical contacts herein referred to may be substantially the same as that illustrated in Fig. 5.

The contact rod 31 is so adjusted that during the gauging operation the contact disk 30 will be brought into engagement therewith if the diameter of the bottle neck opposite the head 19 is greater than the prescribed limit. This engagement of the contacts 30, 31 completes an electrical circuit for a reject mechanism or other indicating device as hereinafter described. If the portion of the bottle neck opposite the conical wall surface 14 is within the prescribed limits the disk 30 will be arrested in its upward movement before making contact with the rod 31. If, on the other hand, the diameter of the bottle neck opposite the head 19 is less than the permissible minimum diameter, the upward movement of the disk 30 will be insufficient to separate it from the contact rod 32. This also permits the operation of a signal and the rejecting means as hereinafter described. The contact rod 32 may be adjusted to permit it to move upwardly a limited distance with the disk 30 before contact therewith is broken.

The expansion cone or head 20 operates on the same principle as above described in connection with the conical head 19 but for testing a different area of the bottle neck. For this purpose, the tubular stem 22 has attached thereto a contact disk 38 which extends between contact rods 39 and 40 mounted on the frame 10 and adjustable therein in the same manner as the contact rod 31. The disk 38 when moved upward by the piston 28 makes contact with the contact rod 39 when the diameter of the bottle neck opposite the expansion head 20 is above the permissible limit. If the diameter is less than the prescribed limit the disk 38 remains in contact with the rod 40 when the disk has been arrested in its upward movement.

For indicating the relative diameters of the bottle neck at the areas opposite the cones 19 and 20 additional contacts 45 and 46 are provided for cooperation with the contact disk 38. The contacts 45 and 46 are both mounted in a holder 47 in the form of a bracket connected by a key 47' to the stem 21 for up-and-down movement therewith. The bracket is slidable along the tube 22. The contact rod 45 and its mounting are of the construction shown in Fig. 5. The contact 46 is mounted in like manner. Engagement of the contact disk 38 with either of the contacts 45, 46 is determined by the relative positions of the stems 21 and 22. If the diameter of the bottle neck is the same in both the indexing zones opposite the cones 19 and 20, the cones will be moved upwardly an equal distance during the test so that the position of the contact disk relative to the contacts 45 and 46 remains unchanged. If there is a difference in the diameters at the two areas under test, the stems 21 and 22 will be moved an unequal distance. If the difference in diameter is above a prescribed limit, the contact disk will be brought into engagement with one of the contacts 45 and 46. Thus, if the upper portion of the bottle neck is comparatively wide and the lower portion restricted, the stem 22 will move upward during the test a greater distance than the stem 21. If the difference in the diameters is beyond the prescribed maximum, the disk 38 will engage the contact 45. If, on the other hand, the diameter of the upper portion of the bottle neck is less than at the lower testing area the movement of the stem 22 will be less than that of the stem 21 and if this difference is greater than the prescribed limit the contacts 46 and 38 will be brought together.

Air under pressure for lifting the cones 19 and 20 during the test is supplied through a pressure pipe 48 and branch pipes 49 extending to the lower ends of the cylinders 25 and 27.

The cones 19 and 20 are lowered by air pressure supplied through a pipe 50 and the manifold 51 extending to the upper ends of the cylinders.

The electrical system for operating the signaling and ejector devices is shown in the wiring diagram (Fig. 2).

The operation is as follows: The bottles or articles under test may be brought in succession, as by means of a traveling conveyor, to the testing station. As each article is arrested at said station the frame 10 is lowered, thereby lowering the gauging plug 12 into the neck of the article to the testing position determined by the spacer 24. At this time the pistons 26 and 28 of the air cylinders are in their lowered position so that the expanding cones 19 and 20 are also in their lowered position. A puff of air is now supplied through the pipe 48, thereby moving the pistons 26 and 28 upwardly. Each of the cones is thus moved upwardly a distance determined by the interior diameter of the neck 11 opposite the cone. If the neck diameter opposite the cone 20 is greater than the prescribed limit, the contact disk 38 will engage the contact 39. The upward movement of the cone is arrested by the adjoining portion of the plug 12 being wedged between the cone and the neck 11. If the diameter at this area is less than the prescribed minimum, the stem 22 will only be moved upward a comparatively short distance, insufficient to separate the contacts 38 and 40.

The lower cone 19 operates in the same manner as the cone 20 for expanding the plug 12 for gauging the diameter opposite said cone. The diameter at this area controls the extent of movement of the stem 21. The contacts 31 and 32 are adjusted so that if the area opposite the cone 19 is above the prescribed diameter the disk 30 will engage the contact 31. If the diameter is below the minimum permissible limit, the disk 30 will not be lifted off the contact 32. This latter contact is adjusted to permit it to move upward with the disk 30 a limited distance. This distance can be adjustably varied to correspond to the prescribed permissible minimum diameter opposite the cone 19.

Referring to the wiring diagram (Fig. 2), the contact disks 30 and 38 are directly connected to a ground wire 54. When the gauging plug 12 has been moved down to testing position as above mentioned and the cones 19, 20 lifted by means of a puff of air to the air cylinders, the contact disks 30 and 38 will be lifted free from the contacts 32 and 40 respectively, providing the diameters at the area under test are within the prescribed limits and will also remain spaced below the contacts 31 and 39. While the cones 19, 20 are in their lifted position a timer switch 55 is momentarily closed. If the contact disk 30 at this time is in engagement with the contact 31, the closing of the switch 55 completes a circuit through a signal lamp 56, return lead 57, switch 55, and a relay solenoid 58. The latter closes a switch 59 and thus completes a circuit for a solenoid 60. The solenoid 60 operates and forms a part of an ejector mechanism. This solenoid 60 may, for example, actuate a time delay relay which in turn operates when the article under test has been advanced to a reject station where it is rejected or segregated from the articles which have passed the test. If the contact disk 30 is in engagement with contact 32 or if the disk 38 is in engagement with any of the contacts 39, 40, 45 or 46 when the switch 55 is closed, the solenoids 58 and 60 will be actuated as above described. A different signal lamp 56 is provided in each of the parallel circuits. Such signal lamps or other equivalent signaling devices serve to indicate the nature of the defect, that is, whether the diameter of the areas opposite the cones 19 and 20 is either above or below a permissible limit and also to indicate whether the difference in diameter at the two areas is either above or below the permissible limits.

Fig. 3 illustrates the cones 19 and 20 in their lifted position during the test. As here shown the lower edge 19ᵃ of the cone 19 is spaced above the lower edge 12ᵃ of the gauging plug 12. This spacing represents the distance through which the cone 19 had been lifted in the gauging operation. The upper cone 20 has been lifted a substantially less distance, the position of the bottom surface of the cone prior to the test being at the line 20ᵃ. These positions of the cones indicate a relatively greater diameter of the bottle neck at the area gauged by the cone 19 than that gauged by the cone 20. The tapered form of the cones 19 and 20 and the corresponding surfaces 14 and 15 of the gauging plug permit the cones to be moved several times the distance through which the gauging plugs are spread laterally. This multiplication of the movements of the gauging elements facilitates the reliable gauging and permits adjustment of the electric contacts to adjust and control with great accuracy the limits at which the signaling and reject mechanisms are actuated.

Modifications may be resorted to within the spirit and scope of my invention.

I claim:

1. Apparatus for gauging the diameter of an interior round surface of the open neck of a hollow article, said apparatus including a gauging element of expansible material, said element having an expansible tubular end portion with a tapered inner surface, means for supporting the gauging element in a fixed position relative to the said article and with said end portion of the gauging element extending into the said open neck, an expanding element mounted for movement within said end portion of the gauging element and having an exterior surface in contact with said tapered surface, means for moving said expanding element lengthwise of the gauging element and thereby expanding the gauging element into contact with said inner neck surface and causing the expanding element to be arrested in a position variable with and dependent upon the diameter of the said neck surface opposite the expanding element when the latter is arrested, a signal device, and electroresponsive means operable by the movement of the expanding element for operating the signal device when the said neck surface is of a greater diameter than the prescribed limit.

2. The apparatus defined in claim 1, including a second signal device and electroresponsive means controlled by the said movement of the expanding element and operable automatically to give a signal when movement of the expanding element beyond a predetermined point is prevented by the said neck surface being of less diameter than a prescribed minimum.

3. Apparatus for gauging the interior cylindrical neck surface of a hollow article, said apparatus comprising a cylindrical gauging element of resilient expansible material, means for holding the gauging element and said article in predetermined relative position with the gauging element projected into said neck opening, said gauging element having an expansible tubular portion with a tapered inner wall surface, an expanding element mounted for lengthwise movement within said tubular portion of the gauging element, said expanding element having an exterior tapered surface in slidable contact with the tapered surface of the gauging element, a motor connected to the expanding element and operable to move the latter lengthwise of the gauging element and expand the latter into engagement with the said neck surface of the article, thereby arresting the expanding element in a position variable with and dependent upon the diameter of said neck surface opposite the expanding element, electroresponsive signal devices, circuit control means for said electroresponsive signal devices operatively connected to the expanding element and operable to effect the operation of one signal device when the expanding element is arrested at a position indicating a diameter of a neck surface less than a prescribed limit and operable to effect the operation of the other signal device when the expanding element moves beyond the limit determined by a neck surface of the maximum diameter within the prescribed limits.

4. A gauging apparatus for gauging the diameter of the interior neck surface of a container, said apparatus including a supporting structure having a stationary mounting, a cylindrical gauging element formed of resilient, elastic material, said element mounted on said structure and extending downward into the open neck of the container, means for holding the gauging element and container in fixed relative position, said gauging element being of hollow construction including gauging sections each having a frusto-conical wall surface forming a portion of the inner wall surface of the gauging element, said sections being spaced lengthwise of the gauging element with an intermediate open cylindrical space, the wall portions of the gauging element defining said intermediate section being of less thickness than the average thickness of the adjoining tapered wall sections, frusto-conical expanding heads mounted in said tapered sections respectively, stems connected to said heads and extending upwardly therefrom, means connected to said stems for moving the expanding heads and thereby expanding the gauging element at the points lengthwise thereof opposite the expanding elements, the extent of movement of the expanding heads being limited and determined by the diameter of the neck surface at points opposite the expanding heads, and signal means operated by the movement of the expanding heads for indicating neck diameters exceeding prescribed limits at the points opposite the expanding heads.

5. Apparatus for gauging an interior surface of a hollow article, said apparatus comprising a cylindrical gauging plug consisting of a resilient, expansible material, said plug formed with a frusto-conical opening extending inwardly from one end thereof, concentric with the plug and with the walls of said opening inwardly convergent from said opening, the plug being formed with a second frusto-conical opening defining an interior open portion in axial alignment with the first opening and spaced therefrom, with a cylindrical opening intermediate the frusto-conical openings and of a diameter substantially equal to the diameter of the frusto-conical openings at their wide ends.

6. The plug defined in claim 5 and in combination therewith, frusto-conical expanding heads within said frusto-conical openings respectively, and means for moving said heads lengthwise of the gauging plug and thereby expanding the gauging plug at points spaced apart lengthwise of the plug, the degree of expansion at each said point being determined by the extent of movement of the corresponding expanding head.

7. The combination defined in claim 6, a tubular stem connected to one of the expanding heads and a stem connected to the other expanding head and extending lengthwise through said tubular stem, and electroresponsive means operated by said stems to indicate diameters of said interior surface exceeding or less than prescribed limits at the gauging points.

8. Apparatus for gauging a substantially cylindrical interior surface of a hollow article, said apparatus comprising a substantially cylindrical gauging plug having a tubular portion extending from one end thereof to an intermediate position lengthwise of the plug, the interior surface of said tubular portion comprising tapered sections spaced apart lengthwise of the plug, conical expanding heads mounted within the plug and respectively engaging said tapered surface sections, and means for moving said heads lengthwise of the plug and thereby causing said heads to spread the contacting portions of the gauging plug into engagement with the opposite surface portions of the said article.

9. The apparatus defined in claim 8, said heads having connected therewith stems extending lengthwise through the plug, and electroresponsive indicating means actuated by the movement of said stems when such movement exceeds a predetermined limit.

10. Gauging apparatus comprising an elastic gauging plug expansible into contact with a surface to be gauged, expanding heads mounted for movement relative to said plug for expanding portions of the latter, motors connected to said heads for moving them to positions determined by the extent to which said portions of the gauging plug are expanded, indicating means for indicating movement of said heads beyond predetermined positions, movable electrical contacts carried by said heads and cooperating stationary contacts in the path of said movable contacts and operable to complete electric circuits controlling the operation of said indicating means.

11. The apparatus defined in claim 10 and in combination therewith additional electric contacts connected respectively to said heads for movement therewith and each movable into and out of engagement with a contact carried by the other of said heads when the relative movements of said heads exceeds predetermined limits.

References Cited in the file of this patent

UNITED STATES PATENTS

| | | |
|---|---|---|
| 2,327,629 | Fedorchak | Aug. 24, 1943 |
| 2,335,775 | Laughton | Nov. 30, 1943 |
| 2,472,875 | Adams | June 14, 1949 |
| 2,508,496 | Conzelman | May 23, 1950 |
| 2,566,970 | Swensson | Sept. 4, 1951 |
| 2,572,368 | Minix | Oct. 23, 1951 |
| 2,635,466 | Roberts | Apr. 21, 1953 |